(12) United States Patent
Duffy et al.

(10) Patent No.: US 9,571,588 B2
(45) Date of Patent: Feb. 14, 2017

(54) SYSTEMS AND METHODS FOR HANDLING A REGISTRATION STORM

(71) Applicant: Sonus Networks, Inc., Westford, MA (US)

(72) Inventors: Mark Duffy, Lexington, MA (US); Tolga Asveren, Bordentown, NJ (US)

(73) Assignee: SONUS NETWORKS, INC., Westford, MA (US)

( * ) Notice: Subject to any disclaimer, the term of this patent is extended or adjusted under 35 U.S.C. 154(b) by 466 days.

(21) Appl. No.: 14/262,436

(22) Filed: Apr. 25, 2014

(65) Prior Publication Data

US 2014/0237089 A1 Aug. 21, 2014

Related U.S. Application Data

(62) Division of application No. 12/973,260, filed on Dec. 20, 2010, now Pat. No. 8,762,499.

(51) Int. Cl.
| | | |
|---|---|---|
| *G06F 15/177* | (2006.01) | |
| *G06F 15/16* | (2006.01) | |
| *H04L 29/08* | (2006.01) | |
| *H04W 4/10* | (2009.01) | |
| *H04L 29/14* | (2006.01) | |

(52) U.S. Cl.
CPC ............. *H04L 67/141* (2013.01); *H04L 69/40* (2013.01); *H04W 4/10* (2013.01)

(58) Field of Classification Search
CPC ....................................................... H04L 69/40
USPC ........................................ 709/200, 220, 222
See application file for complete search history.

(56) References Cited

U.S. PATENT DOCUMENTS

| | | | | |
|---|---|---|---|---|
| 7,440,440 | B1* | 10/2008 | Abichandani | H04M 3/42212 370/351 |
| 8,336,087 | B2* | 12/2012 | Rollet | G06F 21/33 709/229 |
| 2002/0087714 | A1* | 7/2002 | Connor | H04L 67/16 709/235 |
| 2005/0122943 | A1* | 6/2005 | Hyun | H04W 48/18 370/338 |
| 2006/0080410 | A1* | 4/2006 | Maclarty | H04L 29/06 709/220 |
| 2007/0121596 | A1* | 5/2007 | Kurapati | H04L 29/06027 370/356 |
| 2007/0153771 | A1* | 7/2007 | Doradla | H04L 12/66 370/352 |

(Continued)

*Primary Examiner* — Imad Hussain

(74) *Attorney, Agent, or Firm* — Stephen T. Straub; Ronald P. Straub; Michael P. Straub

(57) ABSTRACT

Systems and methods for user device registration are disclosed. In certain embodiments, at least a first edge device in a group of edge devices enters a mass-restart mode. The first edge device receives a request for registration from a user device and determines whether the user device is currently registered through the first edge device. The first edge device generates a notification associated with the user device if the user device is not currently registered through the first edge device. A second edge device in the group of edge devices receives the notification and determines whether the user device is currently registered through the second edge device based on the notification. Registration information about the user device is deleted from the second edge device if the user device is currently registered through the second edge device.

13 Claims, 6 Drawing Sheets

(56) References Cited

U.S. PATENT DOCUMENTS

| | | | |
|---|---|---|---|
| 2008/0144605 A1* | 6/2008 | Qiu | H04M 7/0084 370/352 |
| 2008/0144613 A1* | 6/2008 | Adhikari | H04L 63/1458 370/389 |
| 2008/0263374 A1* | 10/2008 | Shah | H04L 12/10 713/300 |
| 2009/0070406 A1* | 3/2009 | Terpstra | H04L 29/125 709/203 |
| 2009/0204700 A1* | 8/2009 | Satya Sudhakar | H04L 67/104 709/224 |
| 2010/0027529 A1* | 2/2010 | Jackson | H04L 12/6418 370/352 |
| 2010/0034085 A1* | 2/2010 | Qiu | H04M 9/08 370/232 |
| 2010/0103818 A1* | 4/2010 | Griffith | H04L 65/80 370/235 |
| 2010/0250713 A1* | 9/2010 | Sudhakar | H04L 67/104 709/219 |
| 2010/0296443 A1* | 11/2010 | Hirano | H04W 8/082 370/328 |
| 2011/0093584 A1* | 4/2011 | Qiu | H04L 29/12066 709/224 |
| 2011/0141920 A1* | 6/2011 | Yasrebi | H04L 41/0806 370/252 |
| 2011/0141945 A1* | 6/2011 | Eriksson | H04L 29/12283 370/254 |
| 2011/0295996 A1* | 12/2011 | Qiu | G06F 9/505 709/224 |
| 2012/0124431 A1* | 5/2012 | Bauer | H04L 41/0663 714/55 |

* cited by examiner

SYSTEMS AND METHODS FOR HANDLING A REGISTRATION STORM

RELATED APPLICATIONS

The present application is a divisional of U.S. patent application Ser. No. 12/973,260 filed Dec. 20, 2010, which is hereby expressly incorporated by reference in its entirety and which is owned by the assignee of the instant application.

FIELD OF THE INVENTION

The invention relates generally to user device registration in a network environment, and more particularly, to efficient processing of a storm of user device registration requests through edge devices.

BACKGROUND OF THE INVENTION

In Voice over Internet Protocol (VoIP) systems, a user device can regularly register with network servers to access VoIP services. These registration requests are usually processed by edge devices that provide authenticated access to the network servers.

Extreme network traffic load, such as a registration storm, occurs when edge devices receive a large number of requests to register with network servers in a short period of time. A registration storm can be triggered by a large-scale power failure, for example. Upon restoration of power, all user devices affected by the outage can try to register with the network servers at once, resulting in a flood of requests that are processed by the edge devices.

An edge device's ability to limit or filter the network traffic entering a service network can reduce network traffic loads caused by such outages. In addition, an edge device needs to be able to handle a registration storm in a reasonable time and in a manner that optimizes resource utilization.

In general, if a connectionless transport protocol, such as the User Datagram Protocol (UDP), is used between an edge device and a user device, the edge device can detect a failure state of the user device if the edge device does not receive a register refresh message from the user device within a certain time period. However, in certain instances, the duration of an interruptive event, such as a power outage, can be sufficiently short in comparison to the time period such that the failure state of the user device cannot be detected by the edge device in a timely fashion.

In addition, after recovery from an interruptive event, a user device can send its registration request to a different edge device than the edge device to which it sent its request before the event. Hence, the edge device that receives the registration request after the restart of the user device may not know that another edge device in the cluster has already registered the user device. This can occur when a user device is configured with a Fully Qualified Domain Name (FQDN) that is associated with a cluster of edge devices. After the user device restarts, the Domain Name System (DNS) server applies a round-robin algorithm to assign an edge device in the cluster to handle the registration request of the user device, thus ignoring the registration status of the user device in the previous boot cycle. This can also occur if the DNS server responds to a registration request with the address of the least-loaded edge device in the cluster or selects an edge device using another type of load-balancing scheme.

Handling overlapping user device registrations restrains an edge device's ability to process new registration requests timely because the edge device may not have sufficient capacity to accommodate stale registrations as well as new registrations from a large number of user devices during a registration storm. Even though capacity in a cluster of edge devices eventually becomes available, many user devices need to wait for an extended period of time, often several minutes, for stale registrations to time out, thereby freeing available capacity on edge devices before additional user devices can be registered.

SUMMARY OF THE INVENTION

The invention, in various embodiments, features systems and methods for reducing overlapping registrations at edge devices during a registration storm. This allows edge devices to process new registration requests timely and efficiently.

In one aspect, the invention features a computer-implemented method for user device registration. The method includes entering a mass-restart mode by at least a first edge device in a group of edge devices, receiving at the first edge device a request for registration from a user device, determining whether the user device is currently registered through the first edge device, and generating a notification associated with the user device if the user device is not currently registered through the first edge device. The method further includes receiving at a second edge device in the group of edge devices the notification, determining whether the user device is currently registered through the second edge device based on the notification, and deleting registration information about the user device from the second edge device if the user device is currently registered through the second edge device.

In another aspect, the invention features a system for user device registration. At least a first edge device in a group of edge devices enters a mass-restart mode. While in the mass-restart mode, the first edge device receives a request for registration from a user device and determines whether the user device is currently registered through the first edge device. A notification is generated associated with the user device if the user device is not currently registered through the first edge device. A second edge device in the cluster of edge devices receives the notification and determines whether the user device is currently registered through the second edge device based on the notification. Registration information about the user device is deleted from the second edge device if the user device is currently registered through the second edge device.

In yet another aspect, the invention features a computer program product, tangibly embodied in a computer readable medium, for user device registration. The computer program product includes instructions being operable to cause data processing apparatus to enter a mass-restart mode by at least a first edge device in a group of edge devices, receive at the first edge device a request for registration from a user device, and determine whether the user device is currently registered through the first edge device. The first edge device generates a notification associated with the user device if the user device is not currently registered through the first edge device. A second edge device in the group of edge devices receives the notification. The second edge device determines whether the user device is currently registered through it based on the notification. Registration information about the user device is deleted from the second edge device if the user device is currently registered through the second edge device.

In various embodiments, the first edge device proceeds to handle the registration of the user device. In certain embodiments, the notification is sent from the first edge device to the second edge device. In certain embodiments, the notification is stored in a location accessible to the first and the second edge devices. The second edge device can be adapted to access the notification to determine whether the user device is currently registered through the second edge device.

In various embodiments, a plurality of edge devices receives the notification sent by the first edge device. Each of the plurality of edge devices determines whether the user device is currently registered through one of the plurality of edge devices based on the notification. Registration information about the user device can be deleted from one of the plurality of edge devices if the user device is currently registered through one of the plurality of edge devices.

In still another aspect, the invention features a computer-implemented method for user device registration. The method includes entering a mass-restart mode by an edge device, sending a first message from the edge device to a user device that is registered through the edge device, waiting for a second message from the user device, and deleting registration information about the user device from the edge device based on a status of the second message.

In another aspect, the invention features an edge device for user device registration. The edge device is configured to enter a mass-restart mode, send a first message to a user device that is registered through the edge device, wait for a second message from the user device and delete registration information about the user device based on a status of the second message.

In yet another aspect, the invention features a computer program product, tangibly embodied in a computer readable medium, for user device registration. The computer program product includes instructions being operable to cause data processing apparatus to enter a mass-restart mode by an edge device. The edge device is adapted to send a first message from the edge device to a user device that is registered through the edge device. The edge device waits to receive a second message from the user device and deletes registration information about the user device based on a status of the second message.

The first message can be a session initiation protocol (SIP) OPTIONS message. The status of the second message that triggers the deletion of the registration information can be a transmission control protocol (TCP) reset (RST) flag set in the second message. The status of the second message that triggers the deletion of the registration information can be non-receipt of the second message within a time period.

In certain embodiments, to detect a mass restart of user devices in communication with a group of edge devices, a first registration count is collected from at least one edge device in the group of edge devices for at least a first time period. A normal average registration rate is computed based on the first registration count and the at least first time period. In addition, a second registration count is collected from at least one edge device in the group of edge devices for at least a second time period. A current average registration rate is computed based on the second registration count and the at least second time period. An edge device in the group is configured to enter a mass-restart mode if the current average registration rate exceeds the normal average registration rate by a factor. Additionally, the entire group of edge devices can enter the mass-restart mode if the current average registration rate exceeds the normal average registration rate by the factor.

While in the mass-restart mode, a third registration count is collected from at least one edge device in the group of edge devices for at least a third time period. A third average registration rate is computed based on the third registration count and the at least third time period. An edge device in the group of edge devices is configured to exit the mass-restart mode if the third average registration rate is less than a threshold. Additionally, the entire group of edge devices can exit the mass-restart mode if the third average registration rate is less than the threshold. The threshold can be determined dynamically or predetermined. The threshold can be related to the normal average registration rate, such as the same as the normal average registration rate.

In certain embodiments, to detect a mass restart of user devices in communication with a group of edge devices, a registration count is collected from at least one edge device in the group of edge devices for at least a first time period. An average registration rate is computed based on the registration count and the at least first time period. An edge device can be configured to enter a mass-restart mode if the average registration rate exceeds a threshold. Additionally, the entire group of edge devices can enter the mass-restart mode if the average registration rate exceeds the threshold.

While in the mass-restart mode, a second registration count is collected from at least one edge device in the group of edge devices for at least a second time period. A second average registration rate is computed based on the second registration count and the at least second time period. An edge device is configured to exit the mass-restart mode if the second average registration rate is less than a second threshold. Additionally, the entire group of edge devices can exit the mass-restart mode if the second average registration rate is less than the second threshold.

In certain embodiments, an external source, such as an operator, can place an edge device in a mass-restart mode through interaction with a mode-setting command. The external source can also cause the entire group of edge devices to enter the mass-restart mode.

In certain embodiments, an external source can cause an edge device in a mass-restart mode to exit the mode through interaction with a mode-setting command. The external source can also cause the entire group of edge devices to exit the mass-restart mode.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
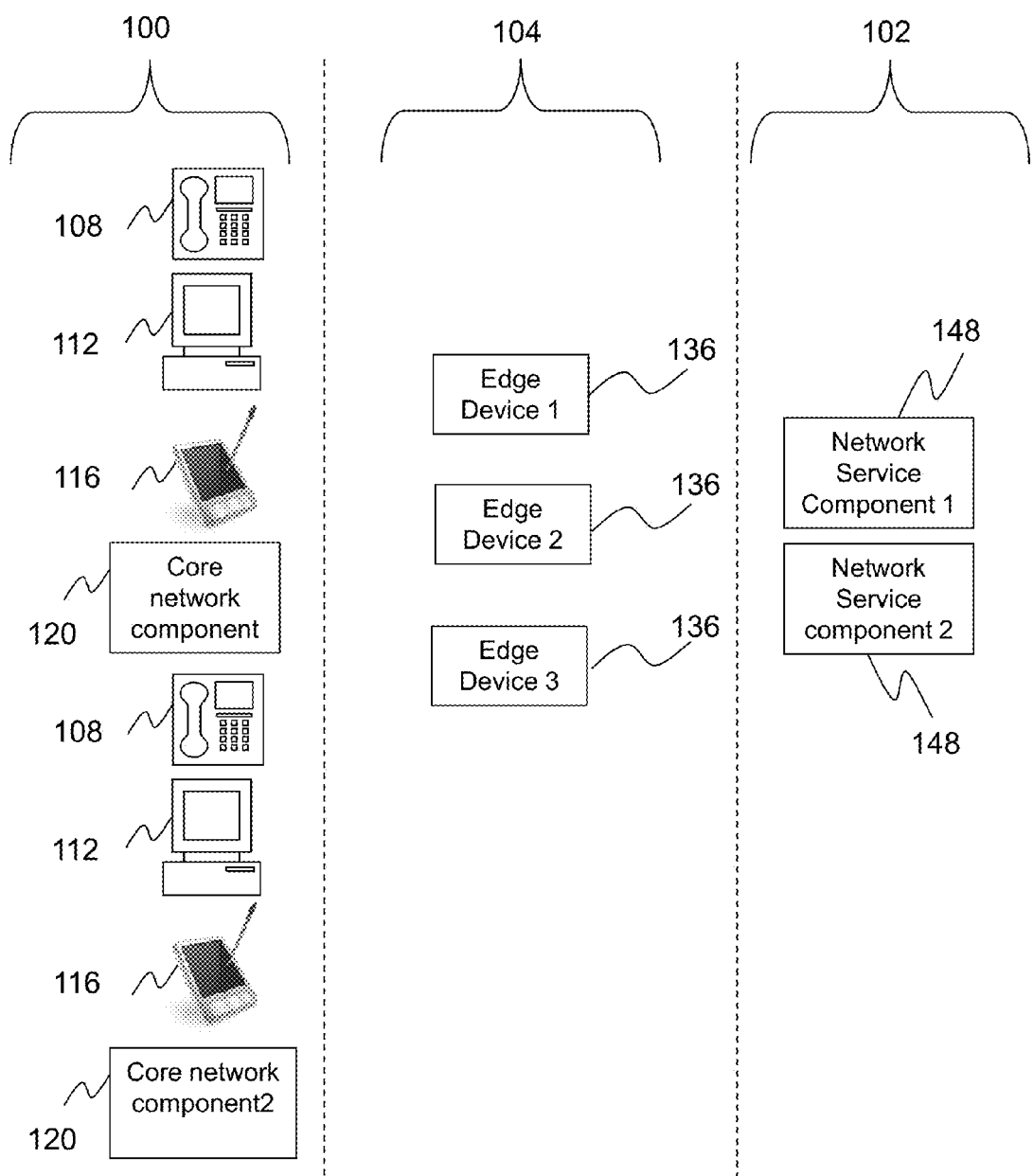
FIG. 1 shows a schematic diagram of an exemplary network environment for registering user devices.

FIG. 1 shows a schematic diagram of an exemplary network environment in which user devices 100 access network servers 102 via edge devices 104. A user device 100 can be, for example, a telephone 108, a computer 112, a personal digital assistants (PDA) 116, or other electronic devices capable of interfacing with an edge device. A user device 100 can include a core network component 120, which can be telephone switches, soft switches, or session border controllers. An edge device 136 can be, for example, a router, a routing switch, an integrated access device (IAD), a multiplexer, a session border controller, or any device that can provide entry points or connections to network components and services. Network servers 102 can include one or more network service components 148.

In general, an edge device 136 operates by processing communication signals from user devices 100 and transmitting them to network service components as needed. An edge device 136 thus provides a layer of security between the user devices 100 and the network service components 148. In an exemplary network environment, edge devices 136 are controlled by a service provider or an enterprise, and user devices 100 are installed at client premises or can be portable. This setup allows edge devices 136 to register clients to enterprise or service provider networks 102. In certain embodiments, an edge device 136 is a Network Border Switch™ manufactured by Sonus Networks, Inc., such as an NBS 9000 or NBS5200.

Figure 2:
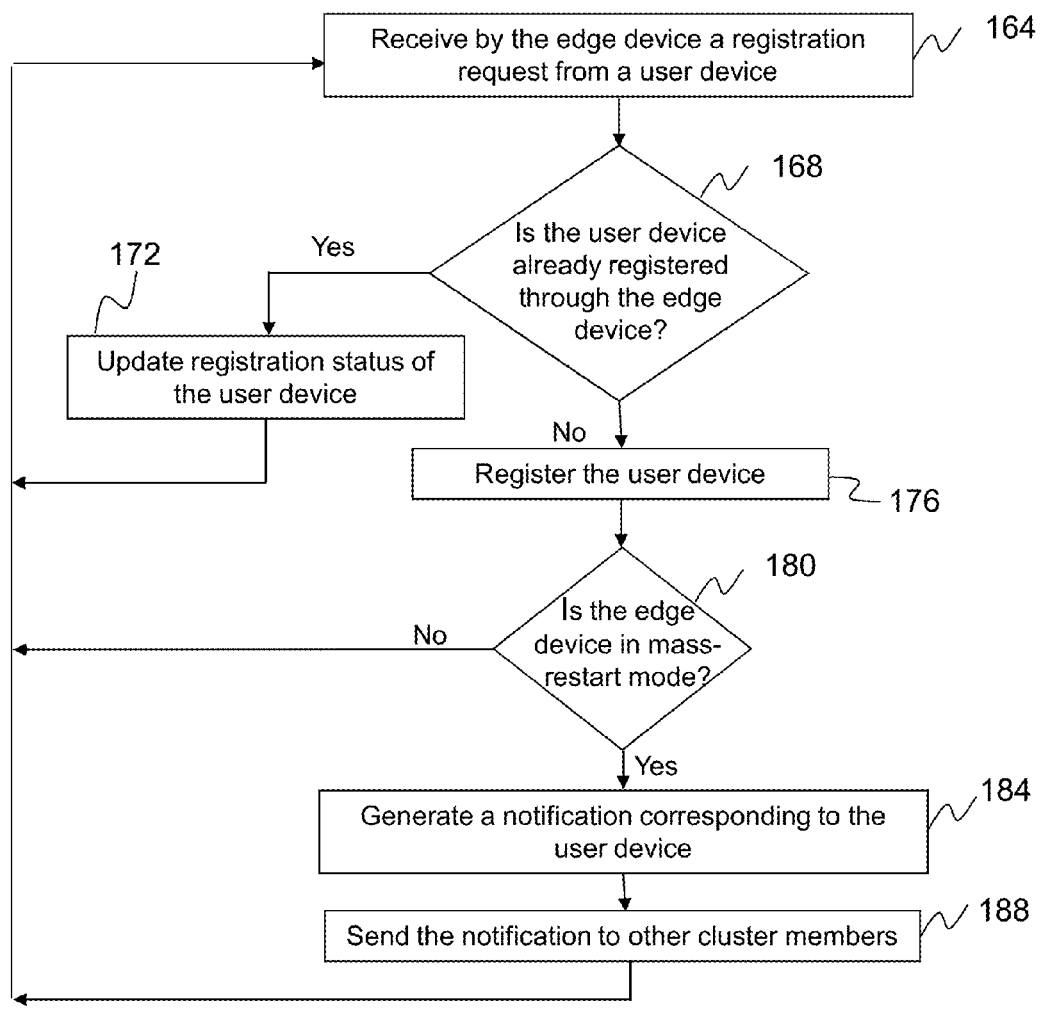
FIG. 2 shows a flow diagram illustrating an exemplary process for detecting overlapping registrations at a cluster of edge devices during a registration storm.

FIG. 2 shows a flow diagram illustrating an exemplary process for detecting overlapping registrations at a cluster of edge devices during a registration storm. When an edge device in the cluster of edge devices receives an initial register request from a user device (step 164), the edge device determines whether the user device is already registered through the edge device (step 168). If the user device is already registered, the edge device updates the registration information of the user device to reflect the current registration status. The registration process then ends with respect to that user device (step 172) and the edge device proceeds to receive and/or process another registration request (starting at step 164). If the user device is not already registered with the edge device, the edge device registers the user device (step 176).

After the edge device registers a new user device, the edge device determines whether it is in a mass-restart mode (step 180). In general, at least one edge device in the cluster of edge devices enters the mass-restart mode if a mass restart of user devices connected to the cluster is detected. Details of the detection procedure are provided below with reference to FIGS. 5 and 6. In some embodiments, all edge devices in the cluster enter the mass-restart mode.

If the edge device is not in the mass-restart mode, it proceeds to receive and/or process another registration request (starting at step 164) without performing further processing of the newly-registered user device.

If the edge device is in the mass-restart mode, the edge device proceeds to generate a notification regarding the newly-registered user device (step 184). For example, the edge device can generate a message that contains an IP address of the user device or a protocol-specific identifier associated with user device, such as an SIP address of record (AoR), along with other information pertinent to the registration process.

While in the mass-restart mode, the edge device can periodically send its list of notifications to other members in the cluster, broadcasting to them the identity of those user devices that are new to the edge device (step 188). In certain embodiments, the edge device sends its list of notifications only once before exiting the mass-restart mode.

In certain embodiments, the edge device directly sends its list of notifications to each member of the cluster. In certain embodiments, the edge device deposits the notifications in a repository system accessible to each cluster member. In this configuration, member edge devices regularly poll the repository system to obtain notifications generated by other edge devices in the cluster. Each edge device can stop this polling action after it exits the mass-restart mode. In addition, once a notification regarding a specific user device is received by all the edge devices in the cluster with the exception of the sender edge device, the notification can be deleted from the repository system.

In certain embodiments, after the edge device completes processing the newly-registered user device in the mass-restart mode, the edge device proceeds to receive and/or process another registration request (starting at step 164).

Figure 3:
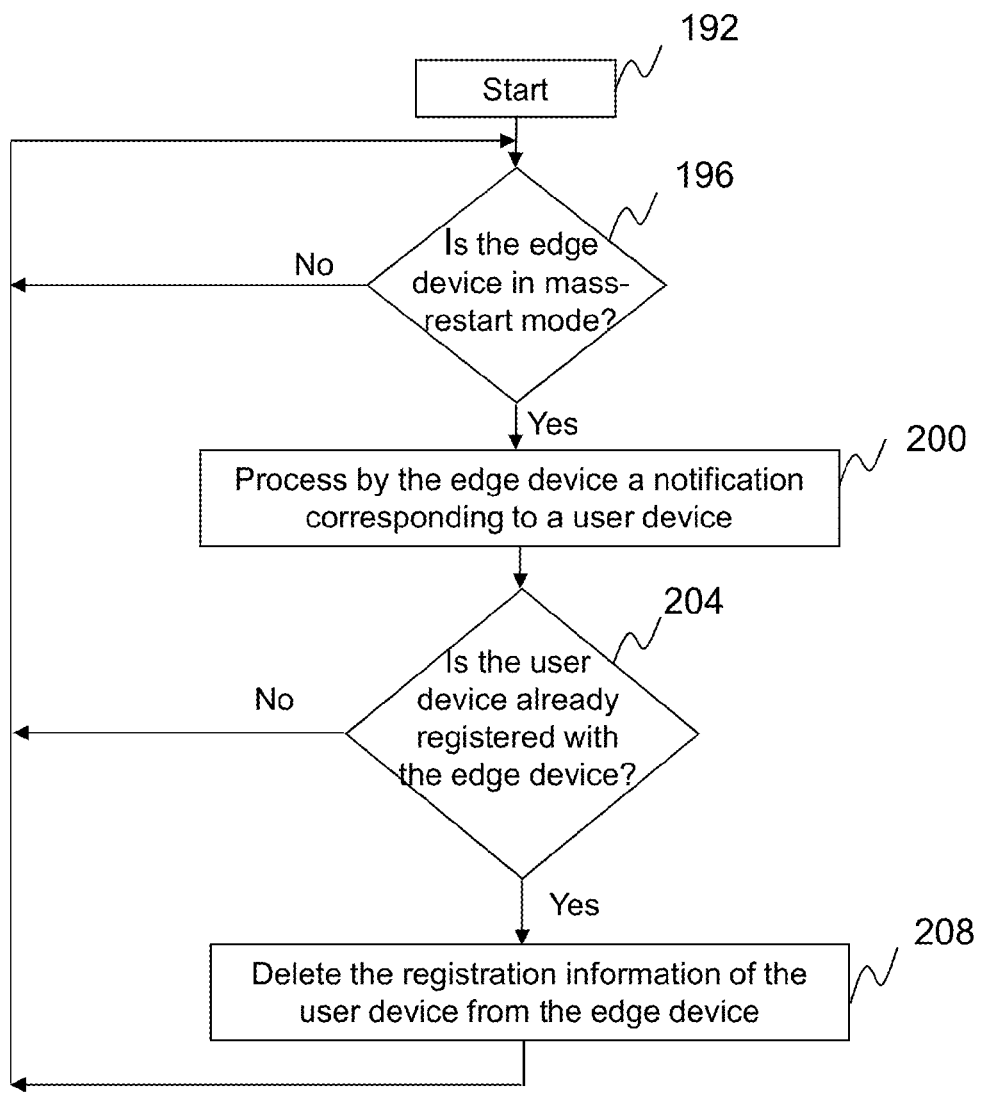
FIG. 3 shows a flow diagram illustrating an exemplary process for reducing overlapping registrations by a cluster of edge devices.

FIG. 3 shows a flow diagram illustrating an exemplary process for reducing overlapping registrations by a cluster of edge devices. The process starts (step 192) upon determining that an edge device in the cluster of edge devices is in a mass-restart mode (step 196). If the edge device is in the mass-restart mode, the edge device processes a list of notifications of user devices sent by another edge device, where each user device on the list is at least new to the sender edge device (step 200). The list of notifications can be sent directly to the receiving edge device from other edge devices in the cluster. In certain embodiments, the edge device is adapted to poll a repository system associated with the cluster to download a list of notifications of user devices while in the mass-restart mode. In certain embodiments, if it is determined that the edge device is not in the mass-restart mode (step 196), the edge device does not process a notification upon receiving it from a cluster member or poll a repository system associated with the cluster for newest notifications.

If the edge device is in the mass-restart mode, it further determines whether each user device on the notification list is already registered through it using information provided by the list, such as an IP address of the user device or a protocol-specific identifier associated with user device, such as an SIP AoR (step 204).

If the edge device does not detect that it has a registration state assigned to a user device on the list, the edge device proceeds to process another notification on the list corresponding to a different user device (starting at step 200), but only after it is determined that the edge device is still in the mass-restart mode (step 196).

If the edge device detects that it has a registration state assigned to a user device on the list, the edge device deletes from its memory the registration information (step 208) associated with the user device. Because each user device on the list is registered through the sender edge device after it is restarted, deletion of repetitive user device registration from the receiving edge device increases the available registration capacity of the receiving device.

In certain embodiments, after the edge device deletes the registration information of the repetitive user device, the edge device proceeds to process another notification (starting at step 200), but only after it is determined that the edge device is still in the mass-restart mode (step 196).

Figure 4:
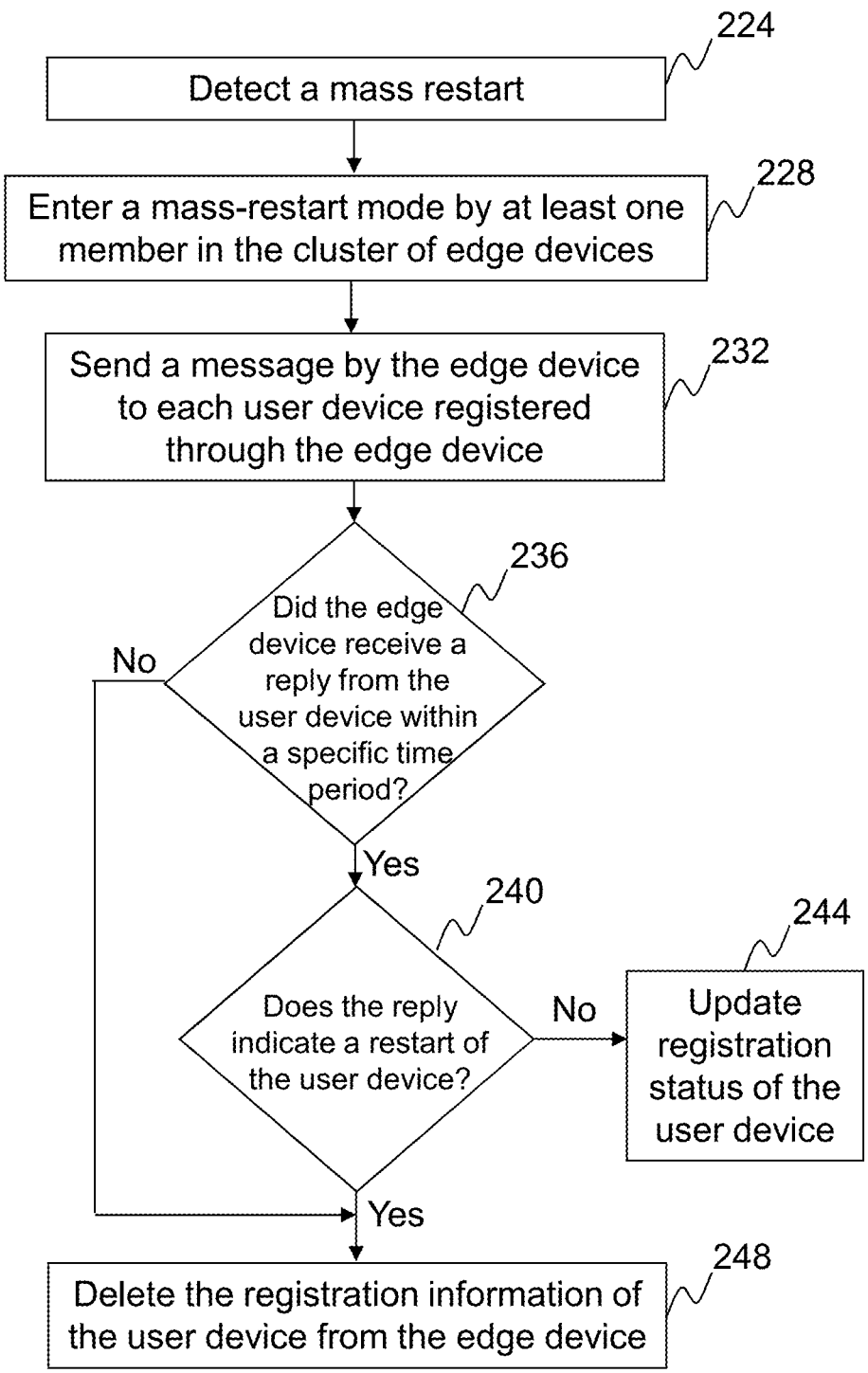
FIG. 4 shows a flow diagram illustrating another exemplary process for reducing overlapping registrations by a cluster of edge devices.

FIG. 4 shows a flow diagram illustrating another exemplary process for reducing overlapping registrations by a cluster of edge devices. The process includes a procedure for detecting a mass restart of user devices in communication with a cluster of edge devices (step 224). Upon detection of a mass restart, at least one edge device in the cluster enters a mass-restart mode (step 228). In some embodiments, all edge devices in the cluster enter the mass-restart mode. In the mass-restart mode, an edge device is configured to send a verification message to each user device registered through it to determine the most current registration state of the user device (step 232). For example, if a reliable transport layer protocol such as the TCP or the Stream Control Transmission Protocol (SCTP) is used between a user device and an edge device, the edge device is adapted to send an SIP OPTIONS message to the user device.

The edge device can determine the registration state of each user device based on the status of the reply message sent by each user device to the edge device in response to the initial verification message. To accomplish this, the edge device first determines whether a reply message is received by the edge device within a specific time period (step 236), and if a reply message is indeed received by the edge device, whether the reply message indicates a restart of the user device (step 240). For example, in a TCP network environment, if the user device sends a reply message to the edge device and the reply message is an SIP REPLY message, this indicates that the user device was not affected by an interruptive event and thus did not restart. In such a case, the edge device simply updates the registration information of the user device to reflect the current registration status and the registration process with respect to that user device ends (step 244).

However, if the TCP connection between the user device and the edge device was terminated by an interruptive event, any message the edge device sent over the TCP connection would not have been received by the user device. Hence, if the edge device does not receive a reply message from the user device within a specific time period, it is an indication that the user device most likely restarted. In such a situation, the edge device deletes registration information of the user device from its memory to increase the edge device's available registration capacity (step 248). Moreover, if the user device sends a reply message to the edge device and the reply message is a TCP message with the reset (RST) flag set, this also indicates that an error was encountered by the user device and the user device most likely restarted. In such a situation, the edge device again deletes the registration information of the user device from its memory (step 248).

In certain embodiments, an edge device sends a verification message to each of its user devices only once while in the mass-restart mode. In certain embodiments, an edge device sends a verification message to each of its user devices multiple times and/or on a periodic basis while in the mass-restart mode.

Figure 5:
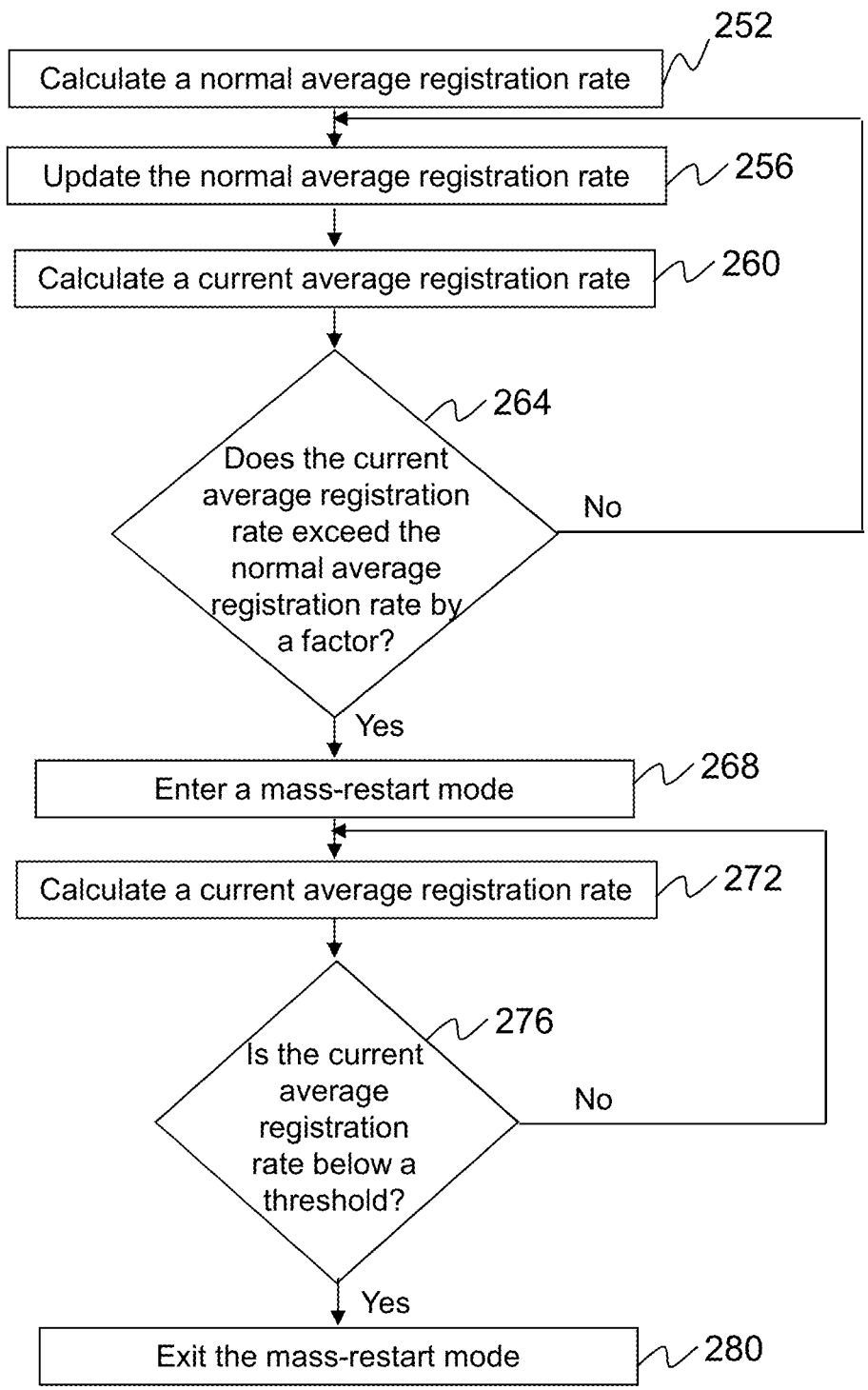
FIG. 5 shows a flow diagram illustrating an exemplary process for entering and exiting a mass-restart mode by at least one edge device in a cluster of edge devices.

FIG. 5 shows a flow diagram illustrating an exemplary process for entering and exiting a mass-restart mode by at least one edge device in a cluster of edge devices. After booting, an edge device counts the number of user device registrations it processed within a certain number of measurement periods, $P_1$. The edge device is able to calculate a normal average registration rate based on the registration count and $P_1$ (step 252). The length of the measurement period and the number of measurement periods used to compute the normal average registration rate can be predetermined or determined dynamically. In certain embodiments, the normal average registration rate is set to a temporary value while the registration count is being compiled during the $P_1$ periods. After the initial $P_1$ periods, the normal average rate can be updated dynamically, either every period or every $P_2$ periods (step 256).

The edge device also computes a current average registration rate based on a registration count collected over a number of most recent measurement periods, $P_3$ (step 260). In certain embodiments, $P_3$ represents one measurement period. In certain embodiments, $P_3$ represents several measurement periods.

The edge device proceeds to determine whether the current average registration rate exceeds the normal average registration rate by a factor (step 264). If it does, the edge device enters a mass-restart mode (step 268). Otherwise, the edge device continues to update the normal average registration rate (step 256) and the current average registration rate (260) and monitor whether the current average registration rate exceeds the normal average registration rate by a factor (step 264). The factor for triggering the mass-restart mode can be predetermined or determined dynamically. In certain embodiments, the edge device announces its current average registration rate to other edge devices in the cluster to coordinate with them when to enter the mass-restart mode.

While in the mass-restart mode, an edge device continues to compute the current average registration rate (step 272). The current average registration rate can be computed over one or multiple recent measurement periods. The edge device also determines whether the current average registration rate is below a threshold (step 276). If it does, the edge device exits the mass-restart mode (step 280). Otherwise, the edge device continues to update the current average registration rate (step 272) and determine whether the current registration rate is below a threshold (step 276). The threshold for triggering exit from the mass-restart mode can be predetermined or determined dynamically. The threshold can be related to the normal average registration rate, such as the same as the normal average registration rate. In certain embodiments, the edge device announces its current average registration rate to other edge devices in the cluster to coordinate with them when to exit from the mass-restart mode.

In certain embodiments, an edge device stops updating the normal registration rate while in the mass-restart mode, but resumes the updating upon exiting the mass-restart mode.

In certain embodiments, all edge devices in a cluster of edge devices can enter and/or exit the mass-restart mode at the same time based on measurements taken at any one of the edge devices in the cluster. In certain embodiments, each edge device in the cluster can enter and/or exit the mass-restart mode independent of other edge devices.

In certain embodiments, an external source, such as an operator, can place an edge device in a mass-restart mode through interaction with a mode-setting command. Additionally, the external source can cause the entire group of edge devices to enter the mass-restart mode.

In certain embodiments, an external source, such as an operator, can cause an edge device in a mass-restart mode to exit the mode through interaction with a mode-setting command. Additional, the external source can cause the entire group of edge devices to exit the mass-restart mode.

Figure 6:
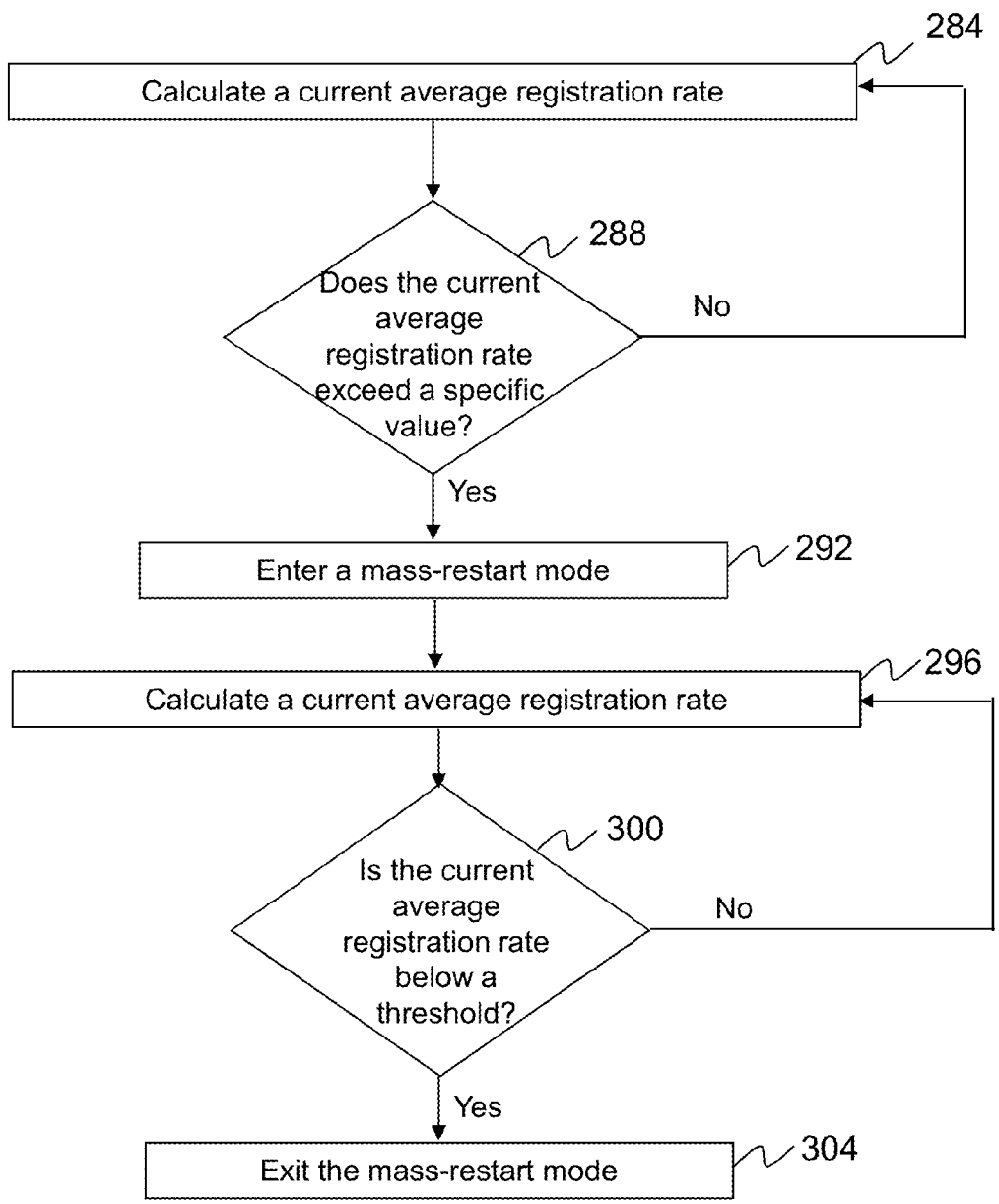
FIG. 6 shows a flow diagram illustrating another exemplary process for entering and exiting a mass-restart mode by at least one edge device in a cluster of edge devices.

FIG. 6 shows a flow diagram illustrating another exemplary process for entering and exiting a mass-restart mode by at least one edge device in a cluster of edge devices. An edge device computes a current average registration rate based on a registration count collected over one or more recent measurement periods (step 284). The length of each measurement period can be predetermined or determined dynamically. The edge device proceeds to determine whether the current average registration rate exceeds a specific value (step 288). If it does, the edge device enters a mass-restart mode (step 292). Otherwise, the edge device continues to update the current average registration rate (284) and determine whether the current average registration rate exceeds the specific value (step 288). In certain embodiments, the edge device announces its current average registration rate to other edge devices in the cluster to coordinate with them when to enter the mass-restart mode.

When an edge device is in the mass-restart mode, it continues to calculate the current average registration rate (step 296). The current average registration rate can be computed over one or multiple recent measurement periods. The edge device proceeds to determine whether the current average registration rate is below a threshold (step 300). If that is true, the edge device exits the mass-restart mode (step 304). Otherwise, the edge device continues to update the current average registration rate while in the mass-restart mode (296) and determine whether the registration rate is below a threshold (step 300). In certain embodiments, the edge device announces its registration rate to other edge devices in the cluster to coordinate with them when to exit from the mass-restart mode.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer-implemented method for user device registration, comprising:
    entering a mass-restart mode by an edge device;
    sending a first message from the edge device to a user device that is registered through the edge device;
    waiting for a second message from the user device;
    deleting registration information about the user device from the edge device based on a status of the second message; and
    wherein said entering the mass-restart mode by the edge device further comprises:
    collecting a registration count at the edge device for at least a first time period;
    computing an average registration rate based on the registration count and the at least first time period; and
    entering the mass-restart mode by the edge device if the average registration rate exceeds a threshold.

2. The computer-implemented method of claim 1 wherein the first message is an SIP OPTIONS message.

3. The computer-implemented method of claim 1 wherein the status of the second message that triggers the deleting comprises an RST flag set in the second message.

4. The computer-implemented method of claim 1 wherein the status of the second message that triggers the deleting comprises non-receipt of the second message within a time period.

5. The computer-implemented method of claim 1 further comprising:
    collecting a second registration count from the edge device for at least a second time period while in the mass-restart mode;
    computing a second average registration rate based on the second registration count and the at least second time period; and
    exiting the mass-restart mode by the edge device if the second average registration rate is less than a second threshold.

6. A computer-implemented method for user device registration, comprising:
    entering a mass-restart mode by an edge device;
    sending a first message from the edge device to a user device that is registered through the edge device;
    waiting for a second message from the user device;
    deleting registration information about the user device from the edge device based on a status of the second message; and wherein entering the mass-restart mode by the edge device further comprises:
    collecting a first registration count at the edge device for at least a first time period;
    computing a normal average registration rate based on the first registration count and the at least first time period;
    collecting a second registration count at the edge device for at least a second time period;
    computing a current average registration rate based on the second registration count and the at least second time period; and
    entering the mass-restart mode by the edge device if the current average registration rate exceeds the normal average registration rate by a factor.

7. The computer-implemented method of claim 6 further comprising:
    collecting a third registration count from the edge device for at least a third time period while in the mass-restart mode;
    computing a third average registration rate based on the third registration count and the at least third time period; and
    exiting the mass-restart mode by the edge device if the third average registration rate is less than a threshold.

8. An edge device for user device registration, the edge device configured to:
    enter a mass-restart mode;
    send a first message to a user device that is registered through the edge device;
    wait for a second message from the user device;
    delete registration information about the user device from the edge device based on a status of the second message; and
    wherein being configured to enter the mass-restart mode includes being configured to:
    collect a registration count at the edge device for at least a first time period;
    compute an average registration rate based on the registration count and the at least first time period; and
    enter the mass-restart mode by the edge device if the average registration rate exceeds a threshold.

9. The edge device of claim 8 wherein the first message is an SIP OPTIONS message.

10. The edge device of claim 8 wherein the status of the second message that triggers the deleting comprises an RST flag set in the second message.

11. The edge device of claim 8 wherein the status of the second message that triggers the deleting comprises non-receipt of the second message within a time period.

12. The edge device of claim 8 wherein said edge device is further configured to:
   collect a second registration count for at least a second time period while in the mass-restart mode;
   compute a second average registration rate based on the second registration count and the at least second time period; and
   exit the mass-restart mode if the second average registration rate is less than a second threshold.

13. A computer program product, tangibly embodied in a non-transitory computer readable medium, for user device registration, the computer program product including instructions being operable to cause data processing apparatus to:
   collect a registration count at the edge device for at least a first time period;
   compute an average registration rate based on the registration count and the at least first time period;
   enter a mass-restart mode by an edge device if the average registration rate exceeds a threshold;
   send a first message from the edge device to a user device that is registered through the edge device;
   wait at the edge device to receive a second message from the user device; and
delete registration information about the user device from the edge device based on a status of the second message.

\* \* \* \* \*